Nov. 30, 1948.     C. E. McCORMICK     2,455,017
STORAGE TANK RACK
Filed Dec. 4, 1946
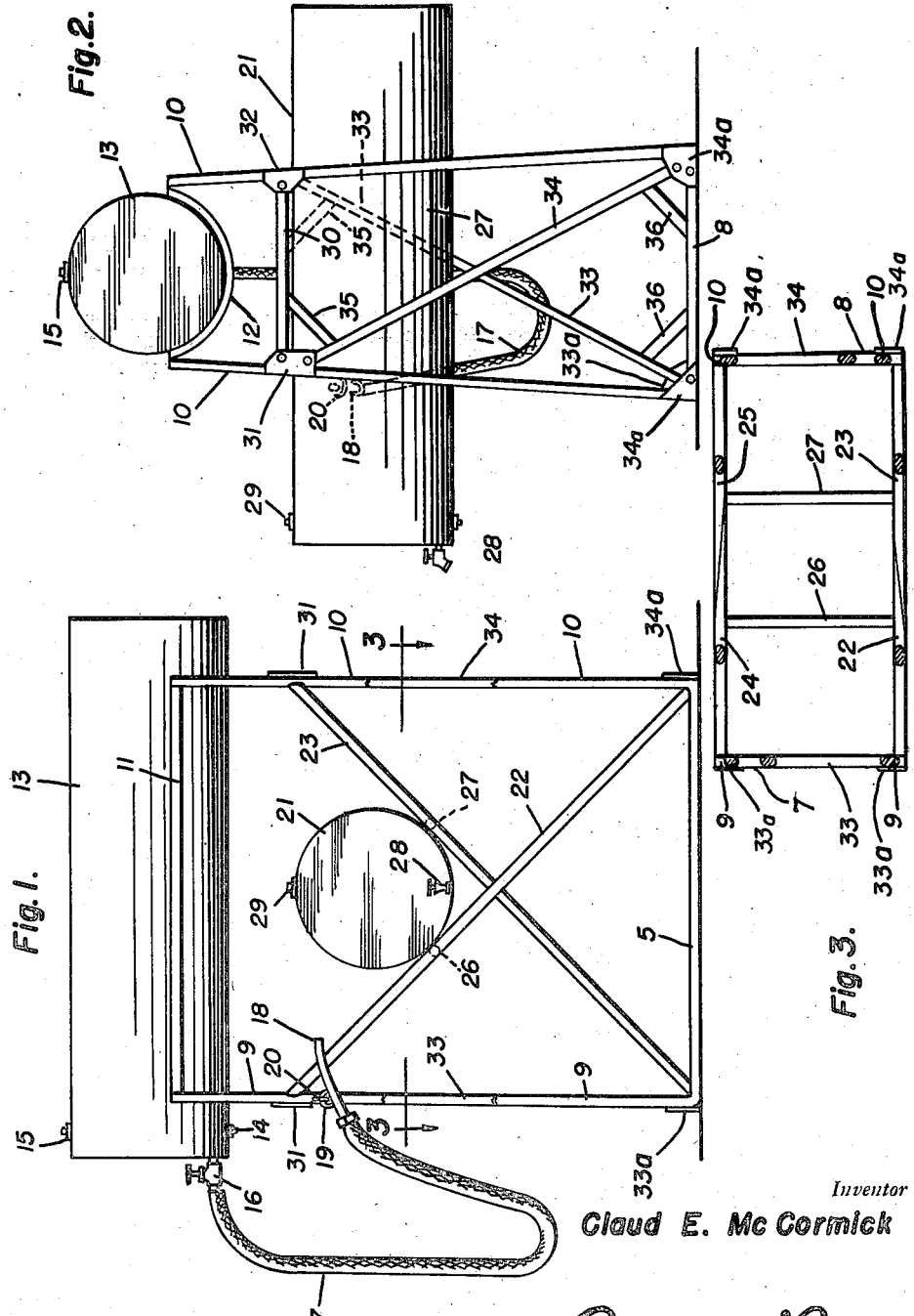
Inventor
Claud E. McCormick Patented Nov. 30, 1948

2,455,017

UNITED STATES PATENT OFFICE 2,455,017

STORAGE TANK RACK

Claud E. McCormick, Snyder, Tex.

Application December 4, 1946, Serial No. 714,096

3 Claims. (Cl. 211—71)

The present invention relates to a novel and improved rack which is adapted to conveniently support, for readily accessible use, storage tanks containing liquid fuel products.

More specifically, the invention has to do with a simple, practical and economical plural tank rank which is expressly, but not necessarily, adapted for use on farms where fuel products are used for supplying powered farm machinery and mechanized farming tools and equipment.

Due to present-day shortages of materials, supplies and equipment, pump-equipped underground tanks are virtually unobtainable. Confronted with the above and appreciative of the needs for fuel storage tanks the present invention, a novel above surface rack, has been devised. Constructed in accordance with the principles of the present inventive concept, the rack will fulfill a long felt need for a satisfactory ways and means of providing the farmer with an adequate supply of easily available and ready-to-use fuel.

An object of the invention is to provide a sturdy reliable open-work rack in which two storage tanks may be satisfactorily cradled, one above the other and at approximate right angles to one another, this in a manner to provide a solution to the above stated problems.

Other objects, features and advantages will become more readily apparent from the accompanying sheet of illustrative drawings.

In the drawings, wherein like numerals are employed to designate like parts throughout the views:

Figure 1 is a side elevational view, with nominal portions broken away, to expose other parts, of a rack constructed in accordance with the principles of the present invention, the fuel storage tanks being shown seated and cradled in said rack for ready use.

Figure 2 is an end view of Figure 1, a view at right angles to Figure 1 and observing the same in a direction from right to left.

Figure 3 is a horizontal section taken approximately on the plane of the line 3—3 of Figure 1, looking in the direction of the arrows, the lower tank being removed for clearness of illustration.

Referring now to the drawings it will be seen that the rack, generally speaking, is in the form of an open type framework. It comprises a horizontal base including spaced parallel side or longitudinal rails 5 (see Figure 3) and transverse end rails 7 and 8. Attached to and rising perpendicularly from these are uprights comprising a pair of front uprights 9 and rear uprights 10. The upper ends of the respective pairs of uprights are connected together by horizontal head rails 11 connected at opposite outer ends with semi-circular saddle members 12. These parts 11 and 12, in conjunction with the rest of the structure, provide an appropriate cradle for the elongated fuel tank 13. The tank 13 is provided with a drain plug 14 on the bottom and a filler plug 15 on top. At one end it is provided with a suitable discharge valve 16 carrying a complemental discharge hose 17, the latter terminating in a convenient nozzle 18 having a hanger eye 19 which, when not in use, is adapted to be hung on a suspension or hanger hook 20 (see Figure 1). Thus, the rack is constructed to accommodate the top or upper fuel tank 13.

In order to accommodate the second fuel tank 21, I provide a slightly different type of supporting cradle. To accomplish this I utilize substantially X-shaped supports on opposite sides of the framework structure. The supports are in the form of rods. The coacting and crossed rods on one side are denoted and differentiated by the numerals 22 and 23 and the ends of the rods are welded or otherwise connected to adjacent and coacting portions of the main frame structure. The similarly constructed and supported rods on the other side, although duplicate, are denoted and differentiated by the numerals 24 and 25 (see Figure 3). Horizontal cross rods 26 and 27 are also provided and these are disposed in spaced parallelism and connected at their ends with adjacent ones of the rods 22, 23, 24 and 25 as shown. Thus, these coacting rods define a crotch or seat in which the tank 21 is saddled as shown in Figures 1 and 2. As the tank 21 is on a lower level it probably need not be provided with a discharge hose. However, at one end it is provided with a spigot or valve 28 and is likewise provided on its top with a filler opening and plug 29.

In order to stabilize the overall frame structure I provide end brace means, that is, brace means at each end of said frame structure. To begin with, I direct attention to the horizontal braces 30 arranged between upper end portions of the respective uprights 9—9 and 10—10, respectively. These are secured in place, if desired, by suitable brackets or clips 31 and 32. In addition there is a relatively long diagonal vertically extending brace and for sake of distinction the one at the front is denoted by the numeral 33 and the one at the rear is denoted by the numeral 34. The lower ends of these are connected by cornice clips or plates 33a and 34a, respectively, to the lower part of the frame structure. The upper ends of said braces 33 and 34 are connected with the brackets or clips 31 already referred to. Between the horizontal braces 30 and the upper end portions of the longer diagonal braces 33 and 34 relatively short stabilizing stub-braces 35 are provided. Similar braces, that is, diagonal stub and auxiliary braces 36 are provided at the lower ends, that is, between the lower end portions of the braces 33 and 34 and adjacent end rails 7 and 8, respectively. As these parts are substantially duplicates of one another, like reference numerals have been employed to designate the same.

It is obvious that the rack may be constructed from readily available materials and that its size will depend largely on the storage tank requirements of a particular or prospective user. Although said rack is of open-style framework construction, and comparatively light in weight and easy to handle and transport, it is nevertheless well balanced, sturdy, and otherwise aptly fitted to attain desired and reliable results.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

What is claimed as new is:

1. A storage tank rack of the class described comprising an open frame-work including horizontal base means and upright means, the upright means being provided at its highest point of elevation with means adapted to cradle a storage tank, two pairs of crossed rods embodied in said framework and connected at their outer ends to the upright means, said crossed rods being disposed in pairs and in parallelism to each other on opposite sides of the framework and being connected by auxiliary parallel cross rods, all of said rods combining in defining a substantially V-shaped seat adapted to cradle a second storage tank, the latter at right angles to the first-mentioned tank.

2. A storage tank rack of the class described comprising an open-style framework embodying horizontal base means, and pairs of upstanding front and rear uprights attached to and rising from said base means, the upper ends of said uprights being connected together by horizontal head rails, and being further connected together by horizontal transversely disposed semi-circular members adapted to accommodate a substantially cylindrical elongated storage tank, and pairs of crossed rods connected at their respective outer ends to adjacent ones of said uprights, the pairs of crossed rods being disposed on opposite sides of the frame structure and being interconnected by horizontal stabilizing rods defining substantially V-shaped seats adapted to support a second storage tank.

3. The structure specified in claim 2, in conjunction with horizontal and diagonal braces connected to the respective front and rear pairs of uprights.

CLAUD E. McCORMICK.

REFERENCES CITED

The following references are of record in the file of this patent:

UNITED STATES PATENTS

| Number | Name | Date |
|---|---|---|
| 232,569 | Thomas | Sept. 21, 1880 |
| 1,569,366 | Goldberg | Jan. 12, 1926 |
| 1,732,829 | Boardman | Oct. 22, 1929 |
| 1,739,403 | Lundberg | Dec. 10, 1929 |
| 1,938,126 | Thompson | Dec. 5, 1933 |
| 2,011,250 | Michel | Aug. 13, 1935 |

FOREIGN PATENTS

| Number | Country | Date |
|---|---|---|
| 756,170 | France | May 27, 1933 |